United States Patent Office
3,235,619
Patented Feb. 15, 1966

3,235,619
PRODUCTION OF CONJUGATED DIOLEFINES
Max Marin Wirth, Dollar, Scotland, assignor to British Hydrocarbon Chemicals Limited, London, England
No Drawing. Filed Sept. 28, 1960, Ser. No. 58,906
Claims priority, application Great Britain, Oct. 6, 1959, 33,903/59
7 Claims. (Cl. 260—681)

The present invention relates to the production of conjugated diolefines.

The production of isoprene by a two-stage process involving the condensation of formaldehyde with isobutene to form 4,4-dimethyl-1,3-dioxane (hereinafter referred to as "dioxane"), and the cracking of the dioxane to form the conjugated diolefine has already been proposed. Formaldehyde is formed in the cracking step and for economical operation it is necessary to recycle this to the dioxane-forming stage.

Hitherto the products of the dioxane-cracking stage have also contained unconverted dioxane and relatively high-boiling intermediates and by-products such as 2-methyl-but-1-ene-4-ol and pyran derivatives. While some of these products can be recovered and recycled to the cracking step together with the unconverted dioxane, or to the dioxane-forming step, their separation from the cracking reaction products introduces complications which increase the operational difficulties and cost of the process.

It has now been discovered that if the catalytic decomposition step is carried out under specific reaction conditions so that substantially complete conversion of the dioxane takes place, a reaction product is obtained consisting essentially only if isoprene, isobutene and formaldehyde, but containing no other by-products, apart from a very small amount of water-insoluble high-boilers which are easily separated by distillation from the isoprene.

According to the present invention the process for the production of isoprene comprises catalytically decomposing 4,4-dimethyl-1,3-dioxane in the vapour phase at a temperature between 300° and 400° at a pressure of not more than 2 atmospheres (absolute) in the presence of between 1.3 and 6.5 moles of water per mole of dioxane and with a partial pressure of dioxane at the start of the reaction of not more than 100 mm. Hg at a flow rate such that substantially complete conversion of the dioxane takes place.

By "substantially complete conversion" is meant that at least 95% of the dioxane is converted. Since the only products are isoprene, isobutene, and formaldehyde, the recovery of the isoprene is greatly simplified; the reaction products may be separated into a hydrocarbon phase and an aqueous phase, and the hydrocarbon phase, after washing with water to remove formaldehyde, may be fractionated to separate the isoprene and to recover the isobutene which may be recycled if desired either to the dioxane-forming stage, or to the catalytic decomposition of the dioxane. The aqueous phase is substantially free from products other than formaldehyde and may be recycled directly to the dioxane-forming stage, if desired after treatment to remove some of the water.

The 4,4-dimethyl-1,3-dioxane used as starting material in the process of the present invention is formed by the condensation of isobutene with formaldehyde, for instance as described in Belgian Patent 565,106, German Patent 1,034,647 and by Arundale and Mikeska, Chemical Reviews, 51, page 505, et seq., 1952. The reaction products from this stage may be distilled to remove lower and higher boiling compounds before being used in the process of the present invention.

A number of different catalysts are known which will catalyse the decomposition of 4-4-dimethyl-1,3-dioxane to form isoprene and which can be used in the process of the present invention. It is preferred to use as catalysts boron phosphate or phosphoric acid deposited on a support such as silica, alumina, kieselguhr, pumice, etc.; the use of boron phosphate deposited on silica gel is particularly preferred. With the boron phosphate/silica gel catalyst and using a dioxane partial pressure of 50 mm., the maximum flow rate for substantially complete conversion is approximately 300 moles total feed/litre catalyst/hour at 300° C., 800 moles/litre/hour at 350° C and 2000 moles/litre/hour at 400° C. Lower rates are needed for higher dioxane partial pressures. With other catalysts the flow rates needed to obtain substantially complete conversion can be readily ascertained.

It is preferred to carry out the reaction at atmospheric pressure, but higher pressures up to 2 atmospheres (absolute) and sub-atmospheric pressures may also be used. If necessary the reaction mixture may contain additional inert diluents to the steam, in order to maintain the dioxane partial pressure at not more than 100 mm. Hg.

The reaction may be carried out in any suitable manner, for instance as a fixed bed process, or as a moving or fluidized bed process. The reaction is endothermic and sufficient heat should be supplied to prevent the temperature falling in the catalyst bed to below about 300° C. If the process is carried out as a single pass system in a fixed catalyst bed adiabatic reactor, a high proportion of steam is needed to provide this heat as the sensible heat of the steam, and the dioxane partial pressure will necessarily be limited to about 20–30 mm. Hg. with a total pressure of one atmosphere. In a preferred embodiment using a fixed bed adiabatic reactor part of the reaction products are returned to the reactor via an external heater to provide additional heat, and in this way the proportion of steam diluent can be reduced, while still maintaining the dioxane partial pressure below about 50 mm.

Where a moving catalyst system is used the endothermic heat of reaction is supplied at least in part as the sensible heat of the solid catalyst which circulates through the reactor and is reheated in an external heater. It is preferred to use a fluidised catalyst system, the catalyst being fed from the reactor to a regenerator/reheater where carbon deposits are burned off by heating to a temperature of up to 500° C., and thence back to the reactor, the heat of combustion of the catalyst carbon supplying part of the endothermic reaction heat.

The process of the present invention is further illustrated with reference to the following examples.

EXAMPLE 1

A series of processes was carried out in which mixtures of 4,4-dimethyl-1,3-dioxane and water were passed over a catalyst consisting of 10% boron phosphate on silica gel in a tubular reactor. The organic portion of the reaction products was examined by gas chromatography for the presence of unreacted dioxane, 2-methyl-but-1-ene-4-ol and other intermediate and by-products.

The results obtained for the first hour of catalyst life are shown below.

Table 1

| Run No. | 1 | 2 | 3 | 4 |
|---|---|---|---|---|
| Reaction Conditions: | | | | |
| Temperature, °C | 300 | 300 | 300 | 400 |
| Dioxane partial pressure, mm. | 50 | 100 | 100 | 100 |
| Space velocity (Total moles/litre/hr.) | 250 | 250 | 500 | 500 |
| Reaction Products: | | | | |
| Dioxane conversion moles, percent | 100 | 85 | 87 | 100 |
| Isoprene efficiency moles, percent | 70 | 72 | 72 | 74 |
| Isobutene | Present | Present | Present | Present |
| 2-methyl-but-1-ene-4-ol | Absent | Present | Present | Absent |
| Dioxane | Absent | Present | Present | Absent |
| Other intermediate products | Absent | Present | Present | Absent |

These results show that when the conversion of dioxane falls below 95% because of variations in the reaction conditions the reaction products contain relatively high boiling intermediate and by-products.

EXAMPLE 2

Two processes were carried out in which mixtures of 4,4-dimethyl-1,3-dioxane and water were passed over a catalyst consisting of 10% boron phosphate on silica gel in a tubular reactor. In run 5 the conversion of dioxane was substantially complete, while in run 6, not according to the invention, only 50.8% conversion of dioxane took place. The organic portion of the reaction products was analyzed by gas chromatographic methods. The reaction conditions and results for the first hour of catalyst life are shown below.

Table 2

| Run No. | 5 | 6 |
|---|---|---|
| Reaction Conditions: | | |
| Temperature, °C | 350 | 350 |
| Dioxane partial pressure, mm. Hg | 100 | 100 |
| Space velocity (Total moles/litre of catalyst/hr.) | 250 | 2,500 |
| Reaction Products: | | |
| Dioxane conversion, moles percent | 98.9 | 50.8 |
| Isoprene efficiency, moles percent | 74.3 | 64.5 |
| Isobutene efficiency, moles percent | 21.2 | 17.4 |
| Formaldehyde efficiency, moles percent | 112.8 | 110.8 |
| Grams formaldehyde formed per 100 grams isoprene formed | 66.9 | 75.8 |
| Methyl dihydropyran, moles percent/100 moles unconverted dioxane | Nil | 2 |
| 2-methyl-but-1-ene-4-ol, moles percent/100 moles unconverted dioxane | Nil | 10 |

The results set out in Table 2 illustrate that when substantially complete conversion of dioxane takes place, not only does the reaction product contain virtually no by-products other than isobutene and formaldehyde, but that the formation of isoprene is also increased.

I claim:

1. The process for the production of isoprene which comprises catalytically decomposing in the presence of a catalyst selected from the group consisting of boron phosphate and phosphoric acid 4,4-dimethyl-1,3-dioxane in the vapour phase at a temperature between 300° and 400° C. at a pressure of not more than 2 atmospheres (absolute) in the presence of between 1.3 and 6.5 moles of water per mole of dioxane and with a partial pressure of dioxane at the start of the reaction of not more than 100 mm. Hg at a flow rate sufficient to provide at least 95% conversion of the dioxane.

2. The process as claimed in claim 1 wherein the catalyst is boron phosphate deposited on a support.

3. The process as claimed in claim 1 wherein the catalyst is boron phosphate deposited on silica gel.

4. The process as claimed in claim 1 wherein the catalyst is phosphoric acid deposited on a support.

5. The process as claimed in claim 1 wherein the partial pressure of dioxane at the start of the reaction is not more than 50 mm., the reaction is carried out over a stationary catalyst and part of the reaction products are reheated and returned to the reaction.

6. The process as claimed in claim 1 wherein the reaction is carried out over a preheated moving catalyst.

7. The process as claimed in claim 6 wherein the reaction is carried out in the presence of a fluidised catalyst, which is continuously regenerated by heating in the presence of molecular oxygen to burn off deposits of carbon, the heat of combustion of the carbon supplying part of the endothermic reaction heat.

References Cited by the Examiner

UNITED STATES PATENTS

| | | | |
|---|---|---|---|
| 2,218,640 | 10/1940 | Friedrichsen et al. | 260—681 |
| 2,241,777 | 5/1941 | Friedrichsen | 260—681 |
| 2,361,539 | 10/1944 | Friedrichsen | 260—681 |
| 2,997,509 | 8/1961 | Wirth | 260—681 |
| 3,057,923 | 10/1962 | Hellin et al. | 260—681 |
| 3,060,238 | 10/1962 | Hellin et al. | 260—681 |
| 3,060,239 | 10/1962 | Hellin et al. | 260—681 |
| 3,060,240 | 10/1962 | Hellin et al. | 260—681 |

FOREIGN PATENTS

| | | |
|---|---|---|
| 1,247,778 | 10/1960 | France. |
| 1,092,902 | 11/1960 | Germany. |
| 874,569 | 8/1961 | Great Britain. |

PAUL M. COUGHLAN, *Primary Examiner.*

ALPHONSO D. SULLIVAN, *Examiner.*